US012210359B2

(12) United States Patent
Hashizume et al.

(10) Patent No.: US 12,210,359 B2
(45) Date of Patent: Jan. 28, 2025

(54) MOBILE CHARGING APPARATUS

(71) Applicant: HONDA MOTOR CO., LTD., Tokyo (JP)

(72) Inventors: Takashi Hashizume, Wako (JP); Ryuichi Kimata, Tokyo (JP); Keiichiro Bungo, Wako (JP); Koichi Tsuno, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/409,898

(22) Filed: Jan. 11, 2024

(65) Prior Publication Data

US 2024/0152151 A1 May 9, 2024

Related U.S. Application Data

(63) Continuation of application No. 17/211,020, filed on Mar. 24, 2021, now Pat. No. 11,906,975.

(30) Foreign Application Priority Data

Mar. 27, 2020 (JP) .................................. 2020-057883

(51) Int. Cl.
*G05D 1/648* (2024.01)
*A01D 34/00* (2006.01)
*B60L 53/14* (2019.01)
*G05D 1/24* (2024.01)
*G05D 1/244* (2024.01)

(52) U.S. Cl.
CPC ........... *G05D 1/648* (2024.01); *A01D 34/008* (2013.01); *B60L 53/14* (2019.02); *G05D 1/24* (2024.01); *G05D 1/244* (2024.01); *B60L 2200/40* (2013.01); *Y02T 90/12* (2013.01)

(58) Field of Classification Search
CPC .. G05D 1/0268; G05D 1/0044; G05D 1/0282; G05D 1/0225; G05D 1/0278; G05D 1/0227; G05D 1/648; G05D 1/244; G05D 1/24; G05D 2201/0208; A01D 34/008; B60L 53/14; B60L 53/30; B60L 53/53;
(Continued)

(56) References Cited

U.S. PATENT DOCUMENTS 8,972,092 B2 3/2015 Yamamura et al.
9,592,742 B1 3/2017 Sosinov et al.
(Continued)

FOREIGN PATENT DOCUMENTS

CN 106655299 A 5/2017
CN 208015394 U 10/2018
(Continued)

OTHER PUBLICATIONS

Office Action (Allowance) dated Jun. 17, 2024, issued in counterpart JP application No. 2024-060377. (2 pages).
(Continued)

*Primary Examiner* — Michael J Zanelli
(74) *Attorney, Agent, or Firm* — WHDA, LLP

(57) ABSTRACT

A mobile charging apparatus is provided. The apparatus comprises a battery for charging a work machine; a movement unit that causes the mobile charging apparatus to autonomously move; and a controller that executes a program to perform control such that the movement unit moves the mobile charging apparatus to a predetermined position to wait for the work machine.

18 Claims, 9 Drawing Sheets

(58) Field of Classification Search
CPC ...... B60L 2200/40; Y02T 90/12; Y02T 90/14; Y02T 90/16; Y02T 10/70; Y02T 10/7072
See application file for complete search history.

(56) References Cited

U.S. PATENT DOCUMENTS

| | | |
|---|---|---|
| 9,660,487 B1 | 5/2017 | Mu et al. |
| 2017/0174092 A1 | 6/2017 | Kohnke |
| 2019/0351783 A1 | 11/2019 | Goei |
| 2021/0323429 A1 | 10/2021 | Fata |

FOREIGN PATENT DOCUMENTS

| | | |
|---|---|---|
| EP | 2894532 A1 | 7/2015 |
| EP | 3316443 A1 | 5/2018 |
| EP | 3540552 A1 | 9/2019 |
| JP | 2012-043072 A | 3/2012 |
| JP | 5828776 B2 | 12/2015 |
| JP | 2019-110614 A | 7/2019 |
| WO | 2020153372 A1 | 7/2020 |

OTHER PUBLICATIONS

Search Report dated Dec. 30, 2021, issued in counterpart FR Application No. 2102987, with English translation. (16 pages).
Office Action dated Oct. 2, 2023, issued in counterpart JP application No. 2020-057883, with English translation. (4 pages) disclosed in U.S. Appl. No. 17/211,020.
Kong; Extending Energy Storage Lifetime of Autonomous Robot-Like Mobile Charger for Electric Vehicles; IEEE Access, vol. 8, pp. 106811-106821; Jun. 8, 2020 (Year:2020). on Jun. 6, 2023 in Non-Final Office Action issued in U.S. Appl. No. 17/211,020.
Maglaras et al.; Cooperative approaches for dynamic wireless charging of Electric Vehicles in a smart city; ENERGYCON 2014; May 13-16, 2014; Dubrovnik, Croatia (Year: 2014). on Jun. 6, 2023 in Non-Final Office Action issued in U.S. Appl. No. 17/211,020.
Arvin et al.; Swarm Robots Long Tern Autonomy Using Moveable Charger; 2009 Intl. Conf. on Future Computer and Communication: Kuala Lumpar, Malaysia:2009; pp. 127-130 (Year: 2009). on Jun. 6, 2023 in Non-Final Office Action issued in U.S. Appl. No. 17/211,020.
Couture-Beil et al.; Adaptive Mobile Charging Stations for Multi-Robot Systems: 2009 IEEE/RSJ Intl. Conf. on Intelligent Robots and Systems; Oct. 11-15, 2009; St. Louis, USA; pp. 1363-1368 (Year: 2009). on Jun. 6, 2023 in Non-Final Office Action issued in U.S. Appl. No. 17/211,020.

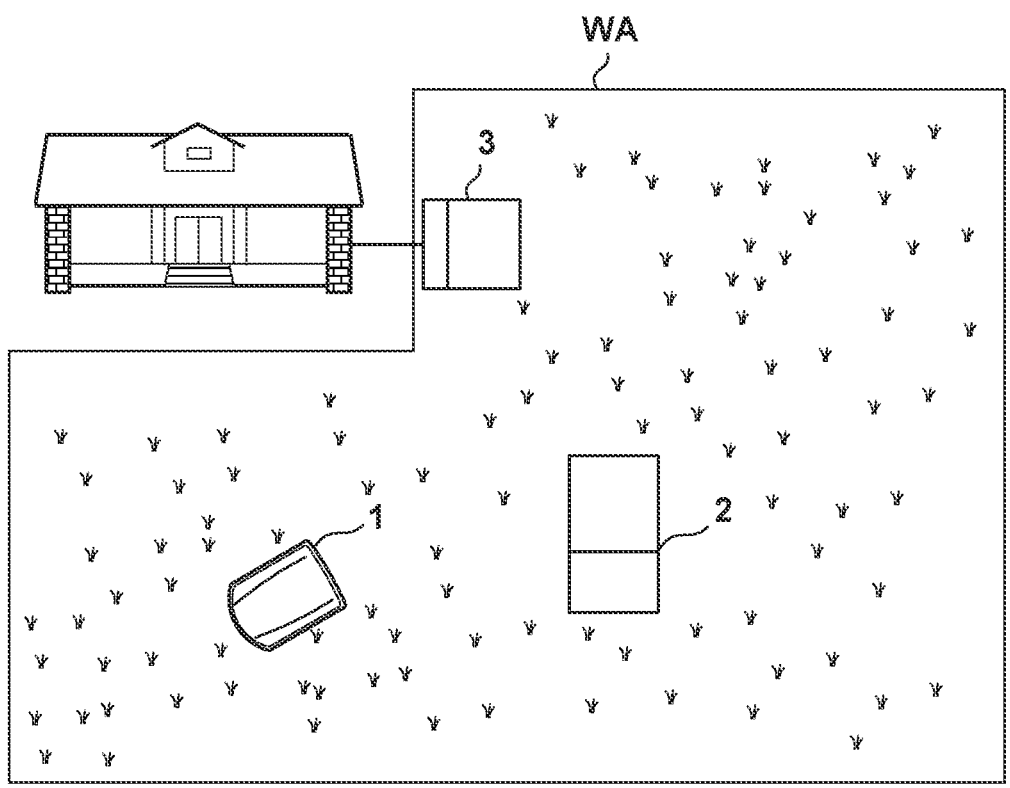

MOBILE CHARGING APPARATUS

CROSS-REFERENCE TO RELATED APPLICATION(S)

This application is a continuation of application Ser. No. 17/211,020, filed Mar. 24, 2021. The patent application identified above is incorporated here by reference in its entirety to provide continuity of disclosure. This application claims priority to and the benefit of Japanese Patent Application No. 2020-057883 filed on Mar. 27, 2020, the entire disclosure of which is incorporated herein by reference.

BACKGROUND OF THE INVENTION

Field of the Invention

The present invention relates to a mobile charging apparatus.

Description of the Related Art

Japanese Patent No. 5828776 describes a driverless work machine (for example, a lawnmower). According to Japanese Patent No. 5828776, the work machine automatically performs work (for example, lawn-mowing) in a work area. Specifically, the work area is defined using a wire (area wire) that generates electromagnetic waves, and the work machine travels within the work area by detecting electromagnetic waves from the area wire, and travels so as to return to the work area when the work machine exits the work area.

According to Japanese Patent No. 5828776, the work machine has a battery incorporated therein, and, when the residual amount of the battery becomes lower than a reference value, the work machine returns to a station (charger) based on electromagnetic waves of the area wire. When the work machine is connected to the station, the battery starts to be charged. Here, every time the work machine is charged, the work machine returns to the fixed station, and thus, if the dimension of the area targeted for work is large, the traveling time for returning to the station and resuming work after being charged is long, which leads to a decrease in the work efficiency, and such travelling simply wastes the battery.

SUMMARY OF THE INVENTION

The present invention saves a time and power that are spent by a work machine travelling in order to be charged, and improves the work efficiency.

According to an aspect of the present invention, a mobile charging apparatus comprising: a battery for charging a work machine; a movement unit that causes the mobile charging apparatus to autonomously move; and a controller that executes a program to perform control such that the movement unit moves the mobile charging apparatus to a predetermined position to wait for the work machine is provided.

According to the present invention, it is possible to save a time and power that are spent by a work machine travelling in order to be charged, and improve the work efficiency.

BRIEF DESCRIPTION OF THE DRAWINGS

FIG. 4 is a schematic diagram showing an example of a use environment of the autonomous work machine and the mobile charger.

DESCRIPTION OF THE EMBODIMENTS

Figure 1A:
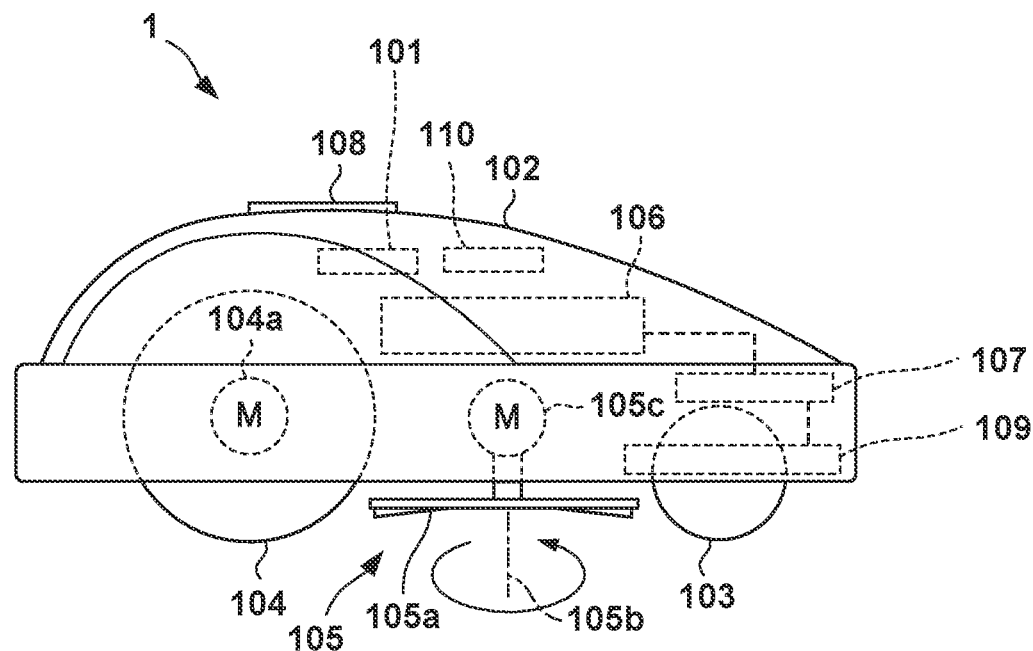
FIGS. 1A and 1B are side views of an autonomous work machine and a mobile charger according to an embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

Autonomous Work Machine

FIG. 1A is a side view of an autonomous work machine 1 according to an embodiment of the present invention. The work machine 1 according to this embodiment is a lawn mower that performs lawn-mowing work while moving on a work ground (lawn). However, the present invention is also applicable to other types of work machines such as snowplows, cultivators, and road pavers.

The work machine 1 is a four-wheel vehicle in which right and left front wheels 103 and right and left rear wheels 104 are supported by a vehicle body 102. The right and left rear wheels 104 are drive wheels, and move the work machine 1 on a work ground. The rear wheels 104 are provided with a drive mechanism that includes a motor 104a as a driving source, and rotation of each of the right and left rear wheels 104 is independently controlled. As a result of independently controlling rotation of each of the right and left rear wheels 104, it is possible to control a direction in which the work machine 1 proceeds. It is also possible to make a pivot turn and a neutral turn. The right and left front wheels 103 are free-rotatably provided.

The work machine 1 includes a work unit 105. The work unit 105 is a mechanism that performs lawn-mowing work on a work ground. The work unit 105 includes a rotating cutter 105a and a drive mechanism for rotating the rotating cutter 105a about an axis 105b that extends in the substantially vertical direction, using a motor 105c as a driving source. The rotating cutter 105a is disposed in the central portion of the work machine 1 in the front-and-rear direction (between the front wheels 103 and the rear wheels 104), on a lower portion of the vehicle body 102. In the rotating cutter 105a according to this embodiment, blades (edges) are provided so as to be able to cut a lawn when the rotation direction is set to either positive rotation or inverse rotation.

The work unit 105 may also include a lifting and lowering mechanism for changing the position of the rotating cutter 105a in the up-down direction. With the above configuration, the work unit 105 can perform lawn-mowing work while the work machine 1 moves using the front wheels 103 and the rear wheels 104.

An operation panel 108 for accepting user's operation input is provided at the top of the vehicle body 102. The operation panel 108 may be provided with a display unit, and a touch panel display may be adopted as the operation panel 108. The user can input various types of information regarding the work machine 1, from the operation panel 108. In addition, a GPS receiving unit 101 is provided in order to specify the position of the work machine 1. In particular, a system that has a high position accuracy such as real-time kinematic GPS (RTK-GPS) is desirably used.

The work machine 1 includes a battery 106 as a power source thereof. The battery 106 supplies power to electric loads (also referred to as "actuators") of the work machine 1 such as the motors 104a and 105c. The battery 106 can be charged by a mobile charging station 2 (also referred to as "mobile charging apparatus" or "mobile station") or a fixed charging station 3 (also referred to as "fixed charging apparatus" or "fixed station"), which will be described later.

According to this embodiment, charging is performed by a non-contact method. In this embodiment, particularly, a description will be given in which an electromagnetic induction method is used. For the electromagnetic induction method, the work machine 1 includes a power receive coil 109 for generating induced electromotive force and a rectification unit 107 that converts generated AC into DC. Note that a contact method that is performed via electrodes may be used as the charging method, or, if a non-contact method is used, another method such as a magnetic resonance method may also be used.

Mobile Station (Mobile Charging Apparatus)

Figure 1B:
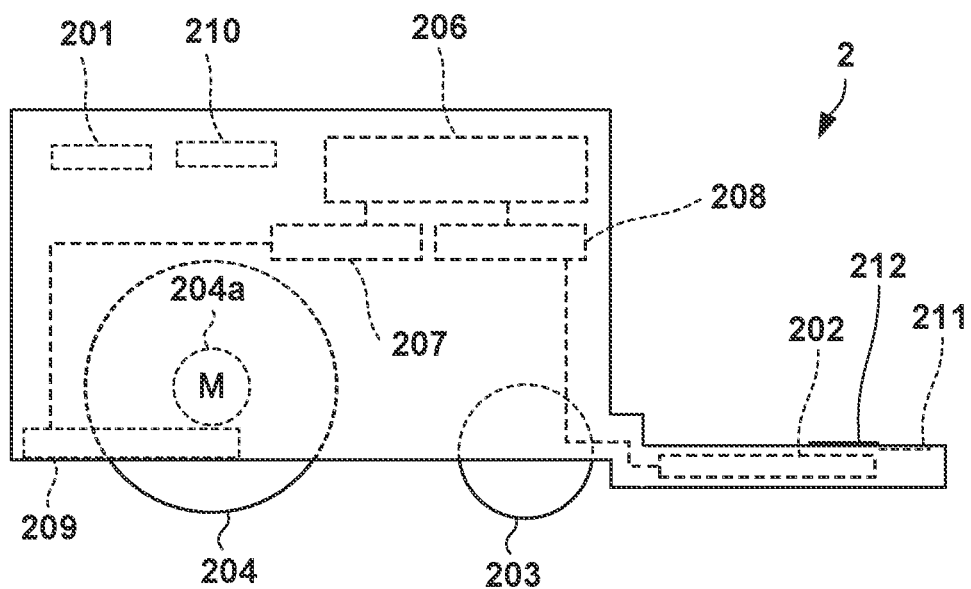

FIG. 1B is a side view of the mobile station 2 according to an embodiment of the present invention. The mobile station 2 according to this embodiment is a mobile charging apparatus for charging a working machine such as a lawn mower. As a matter of course, any work machine other than a lawn mower can be charged, as long as there is compatibility with the charging method and the standard.

The mobile station 2 is a four-wheel vehicle in which right and left front wheels 203 and right and left rear wheels 204 are supported by a vehicle body. The right and left rear wheels 204 are drive wheels, and move the mobile station 2 on a work ground. The rear wheels 204 are provided with a drive mechanism that includes a motor 204a as a driving source, and rotation of each of the right and left rear wheels 204 is independently controlled. As a result of independently controlling rotation of each of the right and left rear wheels 4, it is possible to control a direction in which the mobile station 2 proceeds. It is also possible to make a pivot turn and a neutral turn. The right and left front wheels 203 are free-rotatably provided.

The mobile station 2 includes a control unit 210 that controls movement and charge/discharge of the mobile station 2, and a GPS receiving unit 201 for specifying the position of the mobile station 2. In particular, a system that has a high position accuracy such as real-time kinematic GPS (RTK-GPS) is desirably used for the GPS receiving unit.

The mobile station 2 includes a battery 206 as a power source thereof. The battery 206 supplies power for the motor 204a and the control unit 210, power for charging the work machine 1, and the like. According to this embodiment, charging is performed using the electromagnetic induction method. For the electromagnetic induction method, the mobile station 2 includes a power supply coil 202 for generating induced electromotive force and an inverter 208 for converting DC into AC. Note that a contact method that is performed via an electrode may be used as the charging method, or, if a non-contact method is used, another method such as a magnetic resonance method may also be used.

The mobile station 2 also includes a power receive coil 209 for receiving power supply from the fixed station 3 and the rectification unit 207 in order to charge the battery 206. It is desirable that the power receive coil 209 and the rectification unit 207 are respectively compatible with the power receive coil 109 and the rectification unit 107 of the work machine 1, and are provided at about the same positions (particularly, in height), respectively. As a matter of course, the fixed station 3 has a structure adapted for the power-receiving side. Accordingly, the fixed station 3 can charge not only the mobile station 2 but also the work machine 1. Note that, for example, a battery used as a power source for an electric automobile, electric two-wheeler, or the like can be reproduced and used as the battery 206. With such a configuration, it is possible to reduce the cost for the mobile station, and make it easy to use the mobile station.

In addition, a pad 212 and an electromagnet 211 for removing dirt are provided on the upper portion of the case of the power supply coil 202. The pad 212 may be made of strong raised fabric or a brush, for example, and mainly removes non-metallic dirt. The electromagnet 211 is electrically conducted before charging is started, for example, and removes metal dirt such as metallic pieces. The electromagnet 211 is desirably provided so as to not overlap the power supply coil 202. Accordingly, it is also possible to remove dirt adhered to the bottom portion of the work machine 1 during charging.

Configuration of Work Machine

Figure 2:
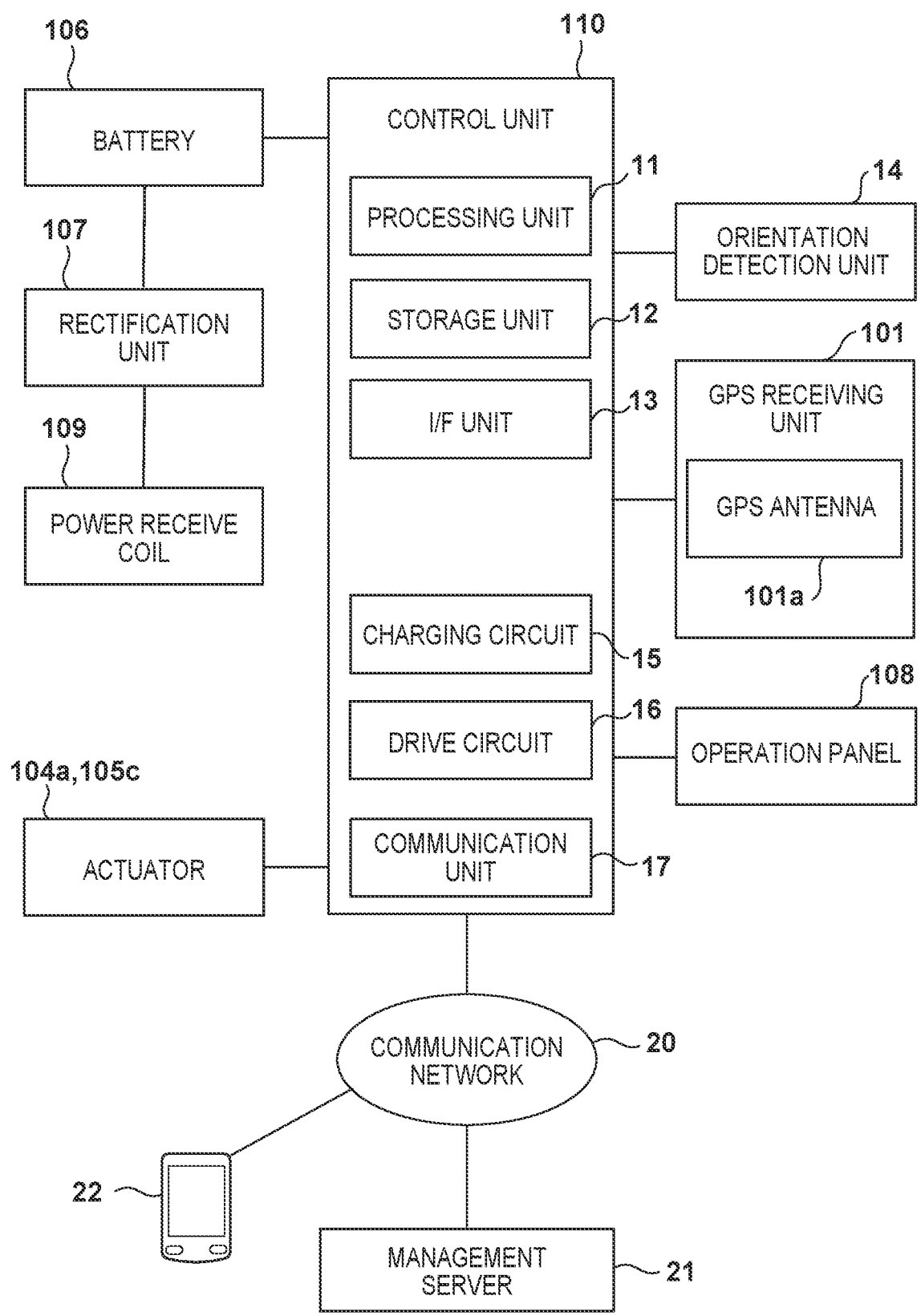
FIG. 2 is a block diagram showing a control unit of the autonomous work machine in FIG. 1A.

Incidentally, the work machine 1 includes a control unit 110 that controls the operations thereof. FIG. 2 is a block diagram showing the configuration of the control unit 110 of the work machine 1 and other constituent elements surrounding the control unit 110.

The control unit 110 includes a processing unit 11, a storage unit 12 such as a RAM or ROM, and an interface unit (I/F unit) 13 that relays transmission/receiving of signals between an external device and the processing unit 11. The processing unit 11 is a processor represented as a CPU, executes a program stored in the storage unit 12, and controls actuators such as the motors 104a and 105c based on a direction detected by an orientation detection unit 14, position information obtained by the GPS receiving unit 101, map information stored in the storage unit 12, and the like. The processing unit 11 performs drive control of the actuators via a drive circuit 16.

The GPS receiving unit 101 is an example of a position sensor, and is also a sensor for specifying the current position of the work machine 1. Besides, the position of the work machine 1 may also be detected, for example, by directly detecting the rotation amount of the drive axis of the rear wheels 104 using a sensor such as a rotary encoder that detects the rotation amount of the right and left rear wheels 104, or by detecting the rotation amount of the output axis of the motor 104a. In that case, as a result of integrating the travelling direction and the travelling distance from a reference position such as the position of the fixed station, it is possible to obtain the current position relative to the reference position. In addition, the current position of the work machine 1 may also be specified based on a detection result of detecting a marker placed in the work ground using a sensor such as a camera, or may also be specified based on information obtained from a beacon placed in the work ground, through wireless communication.

The control unit 110 also includes a charging circuit 15 that charges the battery 106. The charging circuit 15 can charge the battery 106 using power supplied from the mobile station 2 or the fixed station 3 (see FIG. 4) via the power receive coil 109 and the rectification unit 107.

The control unit 110 also includes a communication unit 17. The communication unit 17 can communicate with the mobile station 2 directly or via a communication network 20. Also, the communication unit 17 can perform wireless communication with a management server 21 via the communication network 20. The management server 21 is a server for managing the state of the work machine 1, and can manage information regarding a plurality of pieces of work machines 1, for example. The management server 21 can perform wireless communication with a mobile terminal 22 such as a smartphone via the communication network 20. The mobile terminal 22 is, for example, a terminal of the administrator of the work machine 1, and can receive information regarding the work machine 1 from the management server 21. Accordingly, the administrator can monitor the work machine 1, even from a location separate from the work machine 1. Accordingly, for example, the user can set, for the work machine 1, a map of an area in which the work machine 1 is to perform work (for example, the boundary of an area), through the management server 21. The border of the area can be specified, for example, by designating the coordinates of the corners of a polygon that forms the contour of the area that is to be subjected to work. If one of the corners is designated as a reference point, the boundary lines of the region targeted for work can be specified based on the reference point.

Configuration of Mobile Station

Figure 3:
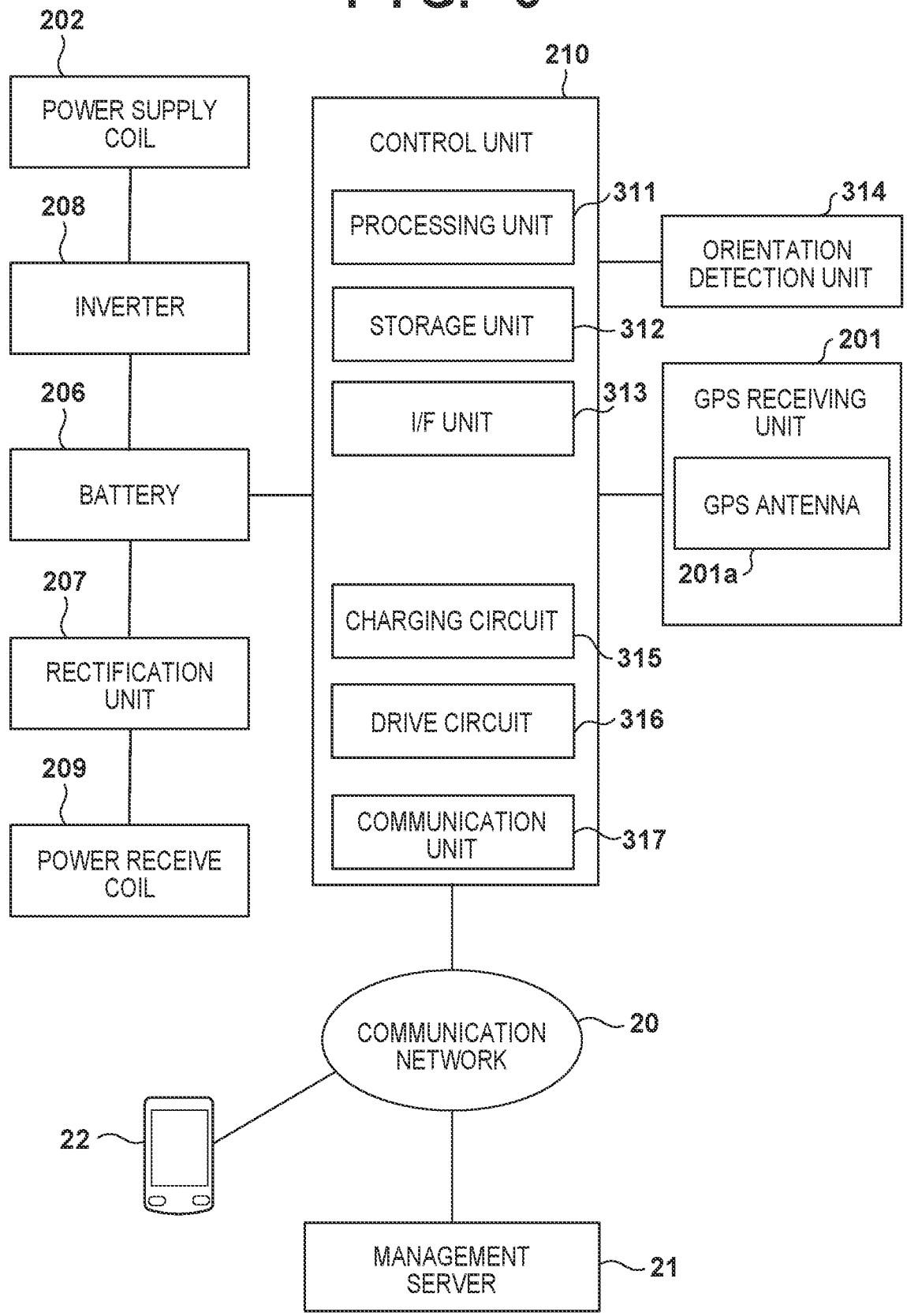
FIG. 3 is a block diagram showing a control unit of the mobile charger in FIG. 1B.

On the other hand, the mobile station 2 includes the control unit 210 that controls operations thereof. FIG. 3 is a block diagram showing the configuration of the control unit 210 of the mobile station 2 and other constituent elements surrounding the control unit 210.

The control unit 210 includes a processing unit 311, a storage unit 312 such as a RAM or ROM, and an interface unit (I/F unit) 313 that relays transmission/receiving of signals between an external device and the processing unit 311. The processing unit 311 is a processor represented as a CPU, executes a program stored in the storage unit 312, and controls actuators such as a motor 204a based on a direction detected by an orientation detection unit 314, position information obtained using the GPS receiving unit 201, map information stored in the storage unit 312, and the like. The processing unit 311 performs drive control of the actuators via a drive circuit 316.

The GPS receiving unit 201 is an example of a position sensor, and is also a sensor for specifying the current position of the mobile station 2. Besides, for example, the position of the mobile station 2 can be specified using a sensor such as a rotary encoder that detects the rotation amount of the right and left rear wheels 204, similarly to the work machine 1.

The control unit 210 also includes a charging circuit 315 that charges the battery 206. The charging circuit 315 can charge the battery 206 using power supplied from the fixed station 3 (see FIG. 4) via the power receive coil 209 and a rectification unit 207. In addition, it is not only that the charging circuit 315 can charge the battery 206 but also that the charging circuit 315 can charge the work machine 1 from the battery 206 via the inverter 208 and the power supply coil 202.

The control unit 210 also includes a communication unit 317. The communication unit 317 can communicate with the work machine 1 directly or via the communication network 20. The communication unit 317 can also perform wireless communication with the management server 21 via the communication network 20. The configuration of the communication network 20 is the same as that described with reference to FIG. 2, and a description thereof is omitted here.

Use Example of Work Machine and Charging Station

FIG. 4 is a schematic diagram showing a use example of the work machine 1, the mobile station 2, and the fixed station 3. When the mobile station 2 is not in use, the mobile station 2 waits at a charging position at which the fixed station 3 performs charging. Furthermore, the work machine 1 waits at a charging position at which the mobile station 2 performs charging. The work machine 1 performs lawn-mowing work on a work ground (lawn) WA adjacent to a house. The work machine 1 according to this embodiment does not have a function for collecting mowed grass, and mowed grass is left on the work ground WA to become fertilizer. Note that, the work machine 1 may have a function for collecting mowed grass, and may include a mechanism for sending mowed grass to a collection bag, for example.

The fixed station 3 is connected to a commercial power source provided from a house, and has a function for charging the mobile station 2 or the work machine 1 via an inverter and a power supply coil similarly to the mobile station 2, although not illustrated. The fixed station 3 is fixed as it is named, and does not move. The work machine 1 starts from the mobile station 2 (or may start from the fixed station 3), performs lawn-mowing work on the work ground WA, and returns to the mobile station 2 (or the fixed station 3). According to this embodiment, the boundary of the work ground WA is registered in the work machine 1 in advance, but a configuration may also be adopted in which the work machine 1 recognizes the boundary based on a marker, transponder, or beacon that indicates the boundary, an area wire that generate a magnetic field, or the like. Furthermore, a configuration may also be adopted in which the shape of the work ground WA, the position of the fixed station 3 in the work ground WA, and the like are learned based on the recognized boundary.

Figure 5A:
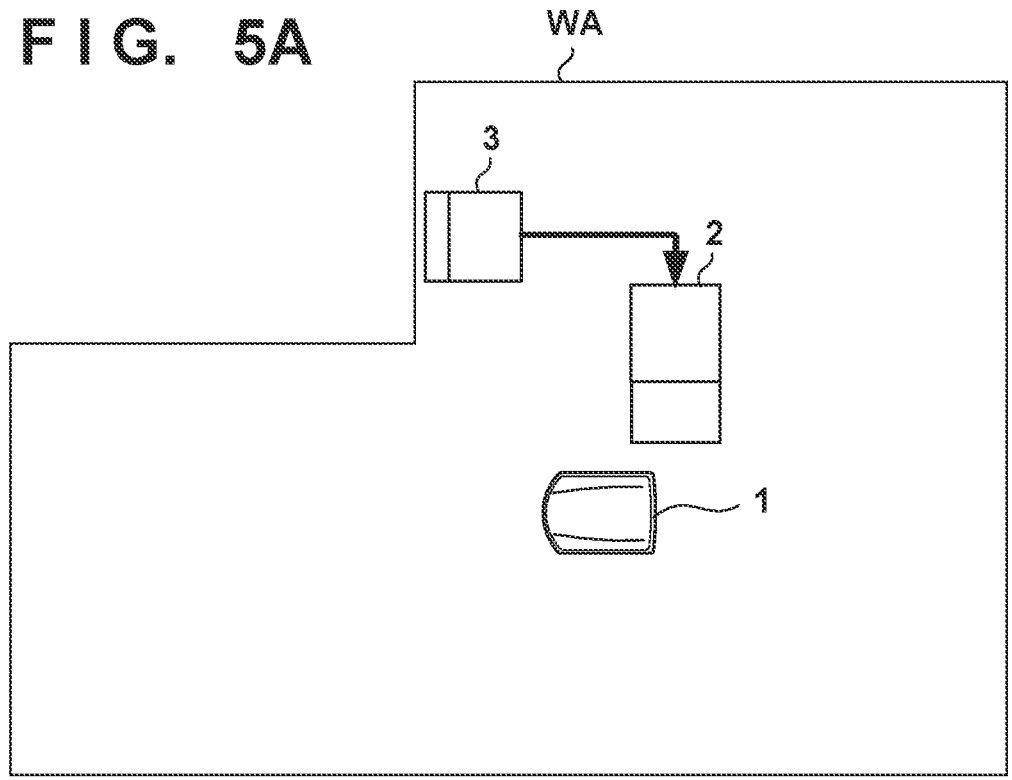
FIGS. 5A and 5B are schematic diagrams showing an example of a use environment of the autonomous work machine and the mobile charger.
Figure 5B:
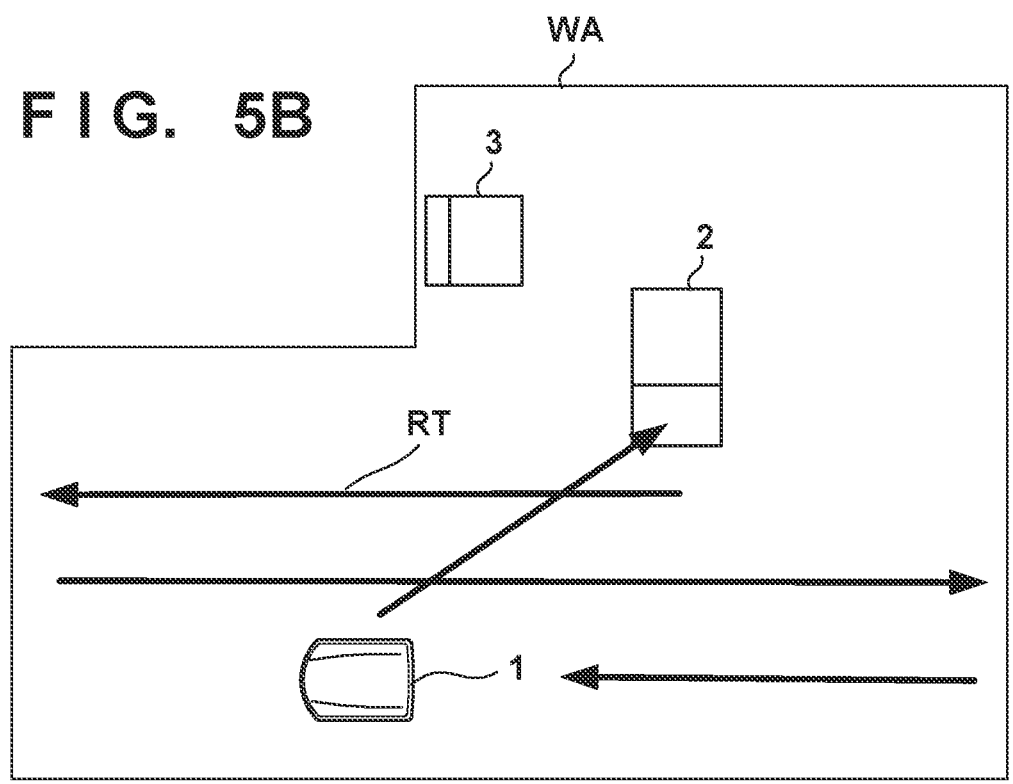

FIGS. 5A and 5B show examples of work performed by the work machine 1 and the mobile station 2. As shown in FIG. 5A, the work machine 1 and the mobile station 2 starts from the fixed station, and move to about the center of the work ground (work area) WA. Here, the mobile station 2 stops at this position, and waits before charging the work machine 1. On the other hand, the work machine 1 starts working at this position.

As shown in FIG. 5B, the work machine 1 performs work in accordance with the current position and a map that has been set along a route RT in advance. As work of the work machine 1 proceeds, the battery is consumed. When the battery residual amount decreases below a predetermined threshold value, the work machine 1 moves to the mobile station 2, which charges the work machine 1. The mobile station 2 has moved to a position that is closer to the work machine 1 than the fixed station 3, and the work machine 1 can move to the charging position in a short time. When the work machine 1 is charged by the mobile station 2, the work machine 1 returns to the position where the work machine 1 suspended work, and starts performing work at the position. Note that, if is there is an area, near the mobile station 2, that has not been subjected to work, the work machine 1 may resume work in this area. In that case, the work machine 1 records an area subjected to work out of the work ground WA in accordance with progress of work such that an area that has not been subjected to work can be specified. In this example, the area in which the work machine 1 has performed work is a belt-like area having a certain width, and thus the area subjected to work may be recorded based on the contour vectors of the belt-like area. With such a configuration, a region that excludes, from the work ground WA, the area subjected to work indicated by the contour vectors can be specified as the work area that has not been subjected to work, for example.

Control Procedure of Work Machine 1

An example of a control procedure of the work machine 1 for performing the control described above with reference to FIG. 6 will be described. The procedure in FIG. 6 is realized as a result of the processing unit 11 executing a program stored in the storage unit 12, for example.

Figure 6:
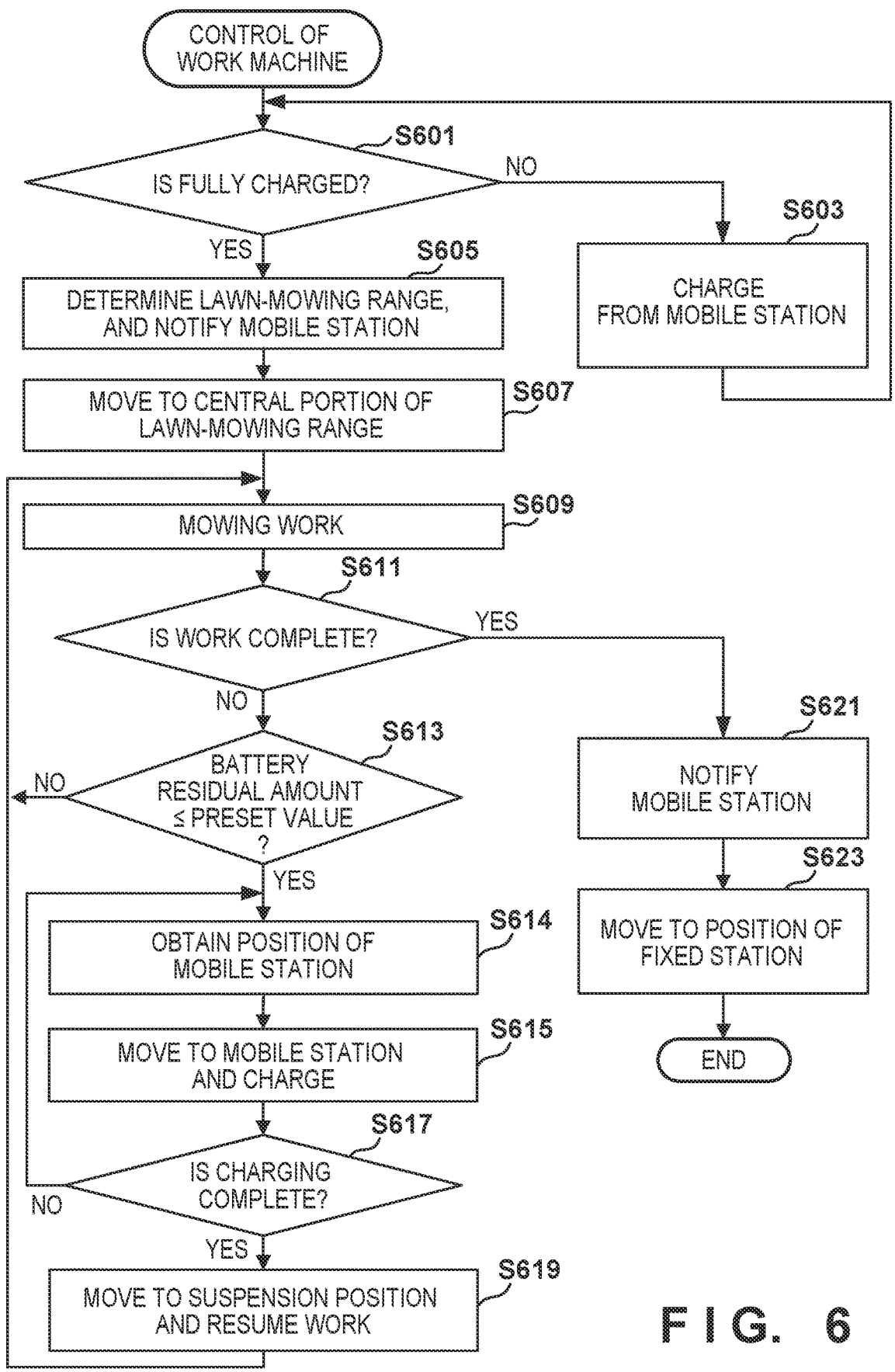
FIG. 6 is a flowchart showing an example of a control procedure of the autonomous work machine.

The procedure in FIG. 6 is started from a state where the work machine 1 is waiting at the charging position of the mobile station 2, in accordance with an instruction to start performing work, for example. This instruction may be given, for example, from the operation panel 108 or the mobile terminal 22, or may also be given at a predetermined time and date or a predetermined time. At this time, the mobile station 2 is waiting at the charging position of the fixed station 3. First, a determination is performed on whether or not the work machine 1 is fully charged (step S601). If the work machine 1 is not fully charged, the mobile station 2 continues to charge the work machine 1 (step S603). Note that, even if it is determined in step S601 that the work machine 1 is not fully charged, a determination is performed on whether or not the charging level is higher than or equal to a certain threshold value, and, if the charging level has not reached the threshold value, the procedure may branch to step S603.

Next, a work range, in other words a lawn-mowing range is determined, and is notified to the mobile station 2 (step S605). At this time, a route may be determined. Note that, if the work range is set in advance, step S605 may be skipped. Next, the work machine 1 moves to about the center of the determined work range (step S607). During this movement, the work machine 1 may work but does not need to work.

When the work machine 1 moves to about the center of work range, the work machine 1 starts working at this position (step S609). A determination is then performed on whether or not work is complete for the entirety of the work ground WA (step S611), and, if it is determined that work is complete, the mobile station 2 is notified that work is complete (step S621). The work machine 1 then moves to the position of the fixed station 3 (in other words, the reference position) (step S623). After the work machine 1 has moved to the position of the fixed station 3, the work machine 1 moves to the charging position of the mobile station 2 that has returned to the fixed station 3, and is charged.

On the other hand, if it is not determined in step S611 that work is complete, a determination is performed on whether or not the battery residual amount is lower than or equal to a preset value (step S613). If the battery residual amount is not lower than or equal to the preset value, the procedure returns to step S609, and the work continues. If it is determined that the battery residual amount is lower than or equal to the preset value, the mobile station 2 is requested for position information thereof, and the position information is obtained (step S614). The work machine 1 then moves using the obtained position of the mobile station 2 as a destination, and the work machine 1 is charged at the charging position (step S615). Note that information indicating not only the position but also the orientation is necessary for charging, and thus the position information that is obtained also includes information indicating the orientation of the mobile station 2. Note that a configuration may also be adopted in which the mobile station 2 outputs a beacon for guiding the work machine 1 to the charging position, for example, and the work machine 1 moves to the charging position accordingly. In addition, the position and orientation of the work machine 1 when work is suspended before moving to the charging position are stored.

When charging is started, a determination is performed on whether or not charging is complete, for example, at a certain interval (step S617). This determination may be similar to that in step S601, for example. When charging is complete, the work machine 1 moves using the position at which the work was suspended as a destination, and resumes the work from that position (step S619).

The work machine 1 performs work according to the above procedure, and, when the battery residual amount becomes low, the work machine 1 can be charged by the mobile station 2 that is waiting near the work machine 1. Therefore, the moving distance for charging is short, and the battery consumption can be suppressed.

Control Procedure of Mobile Station 2

An example of a control procedure of the mobile station 2 for performing the control described above with reference to FIG. 7 will be described. The procedure in FIG. 7 is realized as a result of the processing unit 311 executing a program stored in the storage unit 312, for example.

Figure 7:
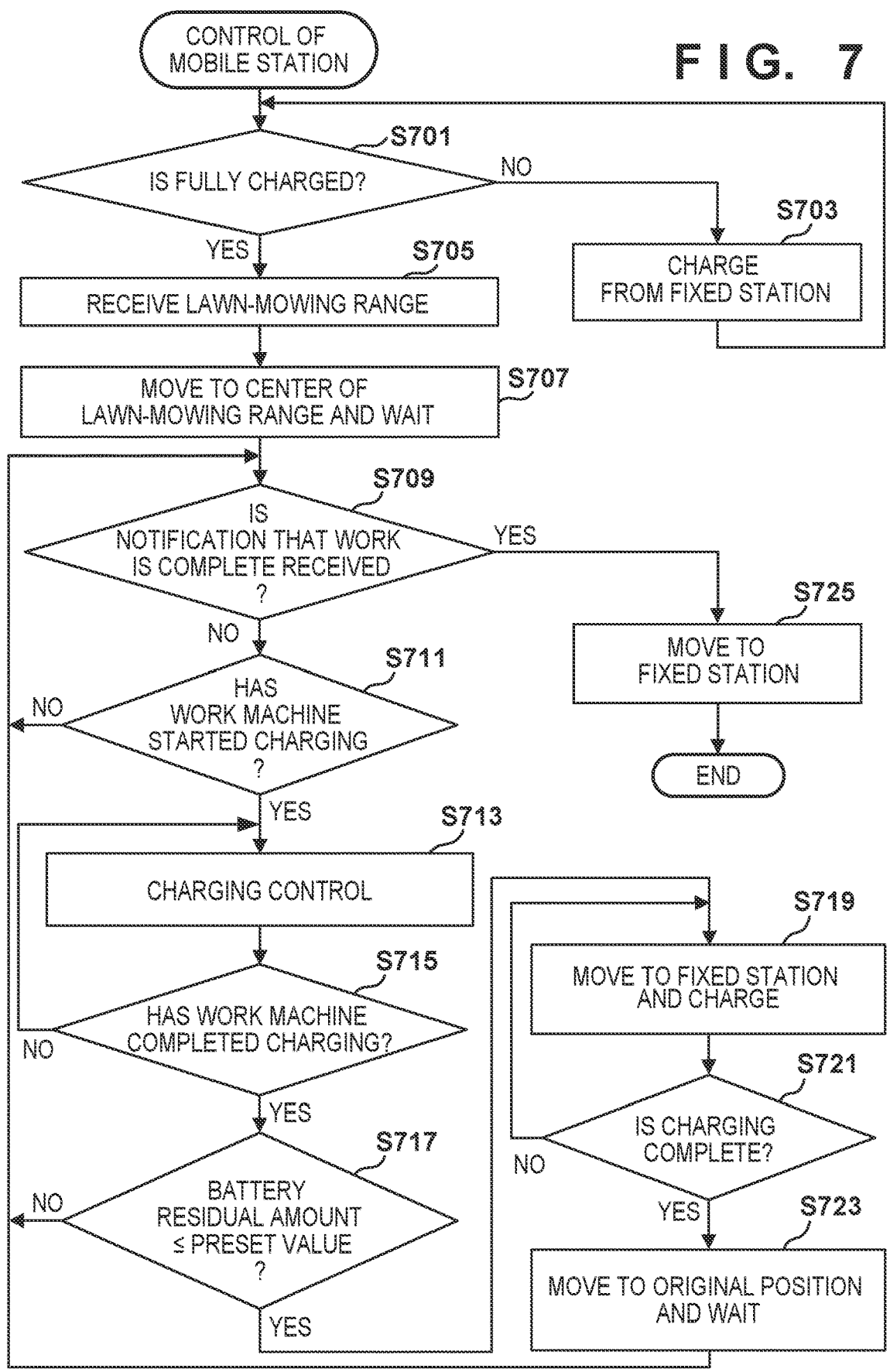
FIG. 7 is a flowchart showing an example of a control procedure of the mobile charger.

The procedure in FIG. 7 is started from a state where the mobile station 2 is waiting at the charging position of the fixed station 3, in accordance with notification, from the work machine 1 that work has started, for example. In FIG. 7, receiving of a lawn-mowing range is illustrated in step S605, and the procedure in FIG. 7 may also be started when this notification is received. First, a determination is performed on whether or not the mobile station 2 is fully charged (step S701). If the mobile station 2 is not fully charged, the fixed station 3 continues to charge the mobile station 2 (step S703). Note that, in step S701, even if the mobile station 2 is not fully charged, a determination is performed on whether or not the charging level is higher than or equal to a certain threshold value, and, if the charging level has not reached the threshold value, the procedure may branch to step S703.

Next, notification indicating a work range, in other words a lawn-mowing range is received from the work machine 1 (step S705). Note that, if the work range is set in advance, and shared with the work machine 1, step S705 may be skipped. Next, the mobile station 2 moves to about the center of the determined work range (step S707). During this movement, work may be performed but does not need to be performed. It is desirable that a specific algorithm of the central position is the same as that of the work machine 1. Note that, in this state, the mobile station 2 is to move using exactly the same position as the work machine 1 as a destination, and thus the mobile station 2 may move using, as a destination position, a position deviated from the center of the work range by a certain distance. After the mobile station 2 moves to the destination position, the mobile station 2 waits at this position.

The mobile station 2 is on standby, waiting for a notification that work is complete, from the work machine 1 (step S709). If a notification that work is complete is received, the mobile station 2 moves to the fixed station 3, and is charged (step S725). On the other hand, if a notification that work is complete is not received, a determination is performed on whether or not the work machine 1 has come to the charging position (step S711). This determination may be performed by a separately provided position sensor, for example, or a configuration may also be adopted in which the power supply coil 202 is electrically conducted at a predetermined interval, and the determination is performed based on a change in the induced electromotive force or the like.

If it is determined that the work machine 1 is at the charging position, charging control is started (step S713). For example, control of a high-speed charge and the like may be performed. While the work machine 1 is being charged, a determination is performed on whether or not charging is complete (step S715). The determination on whether or not charging is complete may be performed, for example, in accordance with the charging amount reaching a predetermined value (for example, full charge). When charging is complete, a determination is performed on whether or not the battery residual amount of the mobile station 2 is lower than or equal to a preset value (step S717). The preset value is, for example, a reference for which the work machine cannot be sufficiently charged, and may be determined in advance, for example. If the battery residual amount is not is lower than or equal to the preset value, the procedure branches to step S709.

If the battery residual amount is lower than or equal to the preset value, the mobile station 2 moves to the position of the fixed station 3, and is charged (step S719). A determination is then performed on whether or not charging is complete (step S721), and if charging is complete, the mobile station 2 returns to the position before the mobile station 2 moved in step S719, and waits (step S723). Note that, at this time, if a notification that work is complete is received from the work machine 1, the mobile station 2 may wait for the work machine 1 at the position of the fixed station 3, in this state.

According to the above procedure, the mobile station 2 moves to near the work machine 1, waits, and can charge the work machine 1. Therefore, the moving distance for charging the work machine 1 is short, and the battery consumption can be suppressed.

Modification 1

Figure 8:
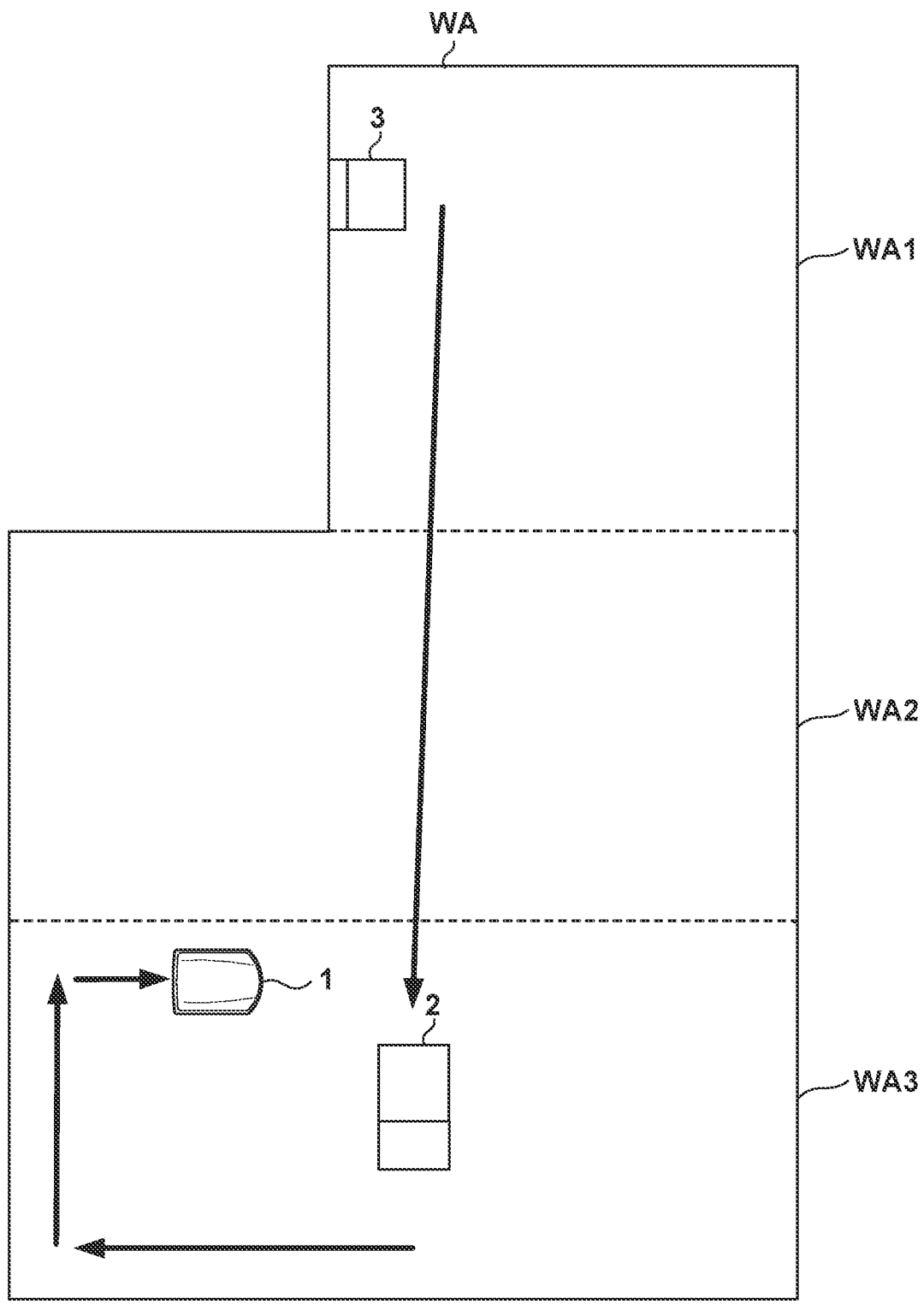
FIG. 8 is a diagram illustrating another example of the use environment of the autonomous work machine and the mobile charger.

In the above embodiment, regarding the entirety of the work ground WA, the work machine 1 and the mobile station 2 move to about the center of the work ground WA, and then starts performing work. However, when the work machine 1 is fully charged, the area dimension for which the work machine 1 can perform work can be known in advance based on the battery capacity, and thus the work region may be divided in units of area dimensions for which the work machine 1 can perform work. FIG. 8 shows an example of such division. In FIGS. 6 and 7, the work machine 1 and the mobile station 2 move to about the central portion of the work ground WA. In contrast, according to this embodiment, the work ground WA is divided in units of area dimensions for which the work machine 1 can perform work. In FIG. 8, the work ground WA is divided into three, namely a region WA1, a region WA2, and a region WA3. This division may be set from a mobile terminal or the like in advance, or the work machine 1, the mobile station 2, or the like may also divide the work ground WA based on a map of the work ground WA.

As shown in FIG. 8, the work machine 1 and the mobile station 2 move to one of such regions (in FIG. 8, WA3). The control described with reference to FIGS. 6 and 7 is performed in the region. In FIG. 6, for example, in this control, WA3 is determined as the work range in step S605, and the mobile station 2 is notified of the coordinates of the boundary of the region WA3 and the like in step S607. As a matter of course, if the mobile station 2 is aware of this region division in advance, it suffices for the work machine 1 to notify the mobile station 2 of where in the regions work is to be performed. The work machine 1 and the mobile station 2 move to the central portion of the region WA3 in accordance with such a notification, and work is performed according to the procedures in FIGS. 6 and 7.

In addition, every time the work machine 1 ends work in one area, the work machine 1 notifies the mobile station 2 of the next area targeted for work along with notification that work is complete. Accordingly, the mobile station 2 can move to the next work area. Note that, here, a description is given as if the work machine 1 takes a leading role, but the mobile station 2 may take a leading role by determining a work area, for example, or a configuration may also be adopted in which the management server 21 determines an area targeted for work, and both the mobile station 2 and the work machine 1 operate dependently of the management server 21.

As a result of adopting such a configuration, the mobile station 2 can move closer to the work machine 1. Thus, even if the area dimension of the work ground is large, it is possible to move the mobile station in accordance with the battery capacity of the work machine, and efficiently accomplish work.

Modification 2

FIGS. 1A and 1B shows a configuration in which the power supply coil and the power receive coil overlap vertically. However, both the coils may also be arranged to erect and overlap. Specifically, a configuration may also be adopted in which the coils are arranged such that the magnetic flux is parallel to the ground and the work machine 1 stops as a result of the power receive coil thereof pressing against the power supply coil of the mobile station 2, and is charged. As a result of adopting such a configuration, the height of the mobile station can be increased, making it easy to move in an area that has not been subjected to work.

Figure 9:
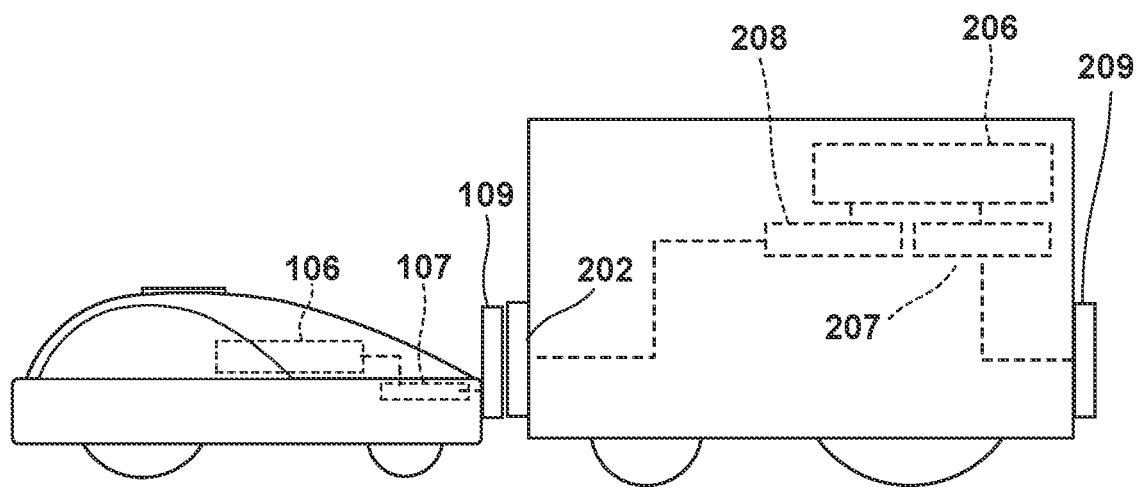
FIG. 9 is a side view of an autonomous work machine and a mobile charger according to another embodiment of the present invention.

FIG. 9 is a side view of a work machine and a mobile station that have such a structure. As illustrated, the power supply coil 202 and the power receive coil 109 are disposed to erect on a horizontal plane. Note that, if the power supply coil 202 and the power receive coil 109 are fixed directly to the main bodies, a gap is likely to be created due to the difference in orientation between the work machine and mobile station. In view of this, in order to prevent it, each of the coils may be fixed to the main body in a swingable manner, via a universal joint or a joint made of an elastic body such as a soft resin that can swing the coil in the horizontal direction and the vertical direction.

As a result of adopting such a configuration, even if there is a difference in orientation of the body, the power receive coil 109 and the power supply coil 202 can be in contact with each other without a gap, and the charging efficiency can be improved. Note that one of the power supply coil 202 and the power receive coil 109 may be fixed in a swingable manner.

Furthermore, in the above embodiment, the mobile station moves to about the center of the work region, but, in a region in which the work machine 1 can perform work on a single charge, the mobile station 2 may move to a position at which the work machine 1 ends work. For example, if the route of the work machine 1 is known in advance, or is notified to the mobile station 2 by the work machine 1, the mobile station 2 can be aware of the position of the end of the route. In view of this, the mobile station 2 moves to the position or into a predetermined range of the position, and waits. With such a configuration, it is possible to further shorten the moving distance for charging the work machine 1.

Embodiment Overview

Overview of the above embodiments is as follows.

(1) Provided is a mobile charging apparatus comprising:
a battery (206) for charging a work machine;
a movement unit (204a, 204) that causes the mobile charging apparatus to autonomously move; and
a controller (210) tha executes a program to perform control such that the movement unit moves the mobile charging apparatus to a predetermined position to wait for the work machine.

With this configuration, when the mobile charging apparatus waits for the work machine at a predetermined position, it is possible to shorten the moving distance for charging the work machine.

(2) According to the above embodiment, provided is the mobile charging apparatus further comprising:
a charging unit that causes the battery to be charged by a fixed charging apparatus,
wherein the predetermined position is closer to the work machine than the fixed charging apparatus is.

With this configuration, the work machine can reach the mobile charging apparatus by travelling a shorter distance than the fixed charging apparatus.

(3) According to the above embodiment, provided is the mobile charging apparatus,
wherein the predetermined position is within a work area in which the work machine performs work.

With this configuration, the mobile charging apparatus can wait near a position at which the work machine works.

(4) According to the above embodiment, provided is the mobile charging apparatus,
wherein, on receiving a notification that the work machine has completed work, the controller controls the movement unit to move the mobile charging apparatus to the fixed charging apparatus.

With this configuration, it is possible to charge the mobile charging apparatus immediately after the work machine has completed work, and be ready for charging the work machine next time.

(5) According to the above embodiment, provided is the mobile charging apparatus further comprising:
a position specifying unit that specifies a position of the mobile charging apparatus; and
a notification unit that notifies the work machine of the position.

With this configuration, the work machine moves to the notified position of the mobile charging apparatus, enabling a prompt charge.

(6) According to the above embodiment, provided is the mobile charging apparatus, further comprising:
a dirt removing unit that removes dirt on a work unit of the work machine.

With this configuration, it is possible to remove dirt from the work machine while charging the work machine.

(7) According to the above embodiment, provided is the mobile charging apparatus,
wherein the dirt removing unit includes an electromagnet for removing a metallic piece and a pad for removing non-metallic dirt.

With this configuration, it is possible to remove dirt that include metal and non-metallic dirt from the work machine while charging the work machine.

The invention is not limited to the foregoing embodiments, and various variations/changes are possible within the spirit of the invention.

What is claimed is:

1. A charging system comprising:
a work machine;
a mobile charging apparatus having battery means for charging the work machine, movement means for moving autonomously, and control means for controlling the movement means to move to a predetermined position and to wait the work machine; and
a fixed charging apparatus for charging the battery means, wherein
the predetermined position is a position closer to the work machine than the fixed charging apparatus, and
the control means controls the movement means to move to the fixed charging apparatus according to that the work machine has completed a work.

2. The charging system according to claim 1, wherein the work machine has another battery means, and
the work machine is configured to move to a position of the mobile charging apparatus when a remaining amount of the another battery means is lower than a predetermined threshold value.

3. The charging system according to claim 2, wherein the work machine is configured to return to a position from which the work machine has started movement to the position of the mobile charging apparatus upon the work machine is charged by the mobile charging apparatus.

4. The charging system according to claim 2, wherein the work machine is configured to resume a work in an unworked area near to the mobile charging apparatus after the work machine has moved to the position of the mobile charging apparatus and has been charged by the mobile charging apparatus.

5. The charging system according to claim 4, wherein the work machine is configured to record a worked area.

6. The charging system according to claim 1, wherein the work machine has another battery means, and
the work machine is configured to wait at a position of charging by the mobile charging apparatus when the work machine is not used.

7. The charging system according to claim 6, wherein the mobile charging apparatus is configured to wait at another position of charging by the fixed charging apparatus when the mobile charging apparatus is not used.

8. The charging system according to claim 7, wherein the work machine and the mobile charging apparatus are configured to depart from the fixed charging apparatus and move to the predetermined position when starting a work.

9. The charging system according to claim 8, wherein the work machine is configured to start a work from the predetermined position.

10. The charging system according to claim 1, wherein the mobile charging apparatus is configured to determine whether another remaining amount of the battery means is equal to or less than a predetermined value.

11. The charging system according to claim 10, wherein the mobile charging apparatus is configured to move to the fixed charging apparatus when the another remaining amount of the battery means is equal to or less than the predetermined value.

12. The charging system according to claim 11, wherein the mobile charging apparatus is configured to return to a position before movement when charging by the fixed charging apparatus is completed.

13. The charging system according to claim 1, wherein the predetermined position is in a work area of the work machine.

14. The charging system according to claim 13, wherein the predetermined position is a position at which the work machine completes a work in the work area, or within a predetermined range from the position.

15. The charging system according to claim 1, wherein the mobile charging apparatus is configured to determine whether the work machine has come to a position of charging by the mobile charging apparatus.

16. The charging system according to claim 1, wherein the fixed charging apparatus is connected to a commercial power source.

17. A charging method in a charging system, wherein the charging system comprises:
- a work machine;
- a mobile charging apparatus having battery means for charging the work machine, and movement means for moving autonomously; and
- a fixed charging apparatus for charging the battery means, the charging method comprising:
- a step of causing the mobile charging apparatus to move to a predetermined position by the movement means, and to wait the work machine; and
- a step of causing the mobile charging apparatus to move to the fixed charging apparatus by the movement means according to that the work machine has completed a work, wherein the predetermined position is a position closer to the work machine than the fixed charging apparatus.

18. A non-transitory computer-readable storage medium storing thereon a program which causes a mobile charging apparatus having battery means for charging a work machine and movement means for moving autonomously to perform:
- a step of controlling the movement means to move to a predetermined position, and to wait the work machine; and
- a step of controlling the movement means to move to a fixed charging apparatus for charging the battery means according to that the work machine has completed a work, wherein the predetermined position is a position closer to the work machine than the fixed charging apparatus.

* * * * *